United States Patent
Davidson et al.

(10) Patent No.: US 6,638,461 B2
(45) Date of Patent: *Oct. 28, 2003

(54) HYBRID DISK-CONE EXTRUSION DIE MODULE

(75) Inventors: Randolph L. Davidson, Menasha, WI (US); Robert John Blemberg, Appleton, WI (US)

(73) Assignee: Pechiney Emballage Flexible Europe (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/916,798

(22) Filed: Jul. 27, 2001

(65) Prior Publication Data

US 2003/0020203 A1 Jan. 30, 2003

(51) Int. Cl.$^7$ .......................... B29C 47/06; B29C 47/20
(52) U.S. Cl. ..................... 264/171.26; 264/171.27; 264/173.12; 264/173.16; 264/209.1; 425/113; 425/133.1; 425/192 R; 425/380; 425/462
(58) Field of Search ................. 425/113, 133.1, 425/192 R, 380, 461, 462, 467; 264/173.12, 173.16, 171.27, 171.26, 209.1

(56) References Cited

U.S. PATENT DOCUMENTS

| | | | | | |
|---|---|---|---|---|---|
| 5,723,157 | A | * | 3/1998 | Grutjen | 425/133.1 |
| 5,738,881 | A | * | 4/1998 | Sagar | 425/133.1 |
| 5,779,959 | A | * | 7/1998 | Teutsch et al. | 425/133.1 |
| 6,077,062 | A | * | 6/2000 | Guillemette et al. | 425/113 |
| 6,345,972 | B1 | * | 2/2002 | Guillemette | 425/113 |

* cited by examiner

*Primary Examiner*—James P. Mackey
*Assistant Examiner*—Joseph Leyson
(74) *Attorney, Agent, or Firm*—McDermott, Will & Emery

(57) ABSTRACT

The present invention discloses an extrusion die module having a flat compression seal and a conical or otherwise angled spillover surface. The die module promotes a flat surface to flat surface compression seal outside of the flow distribution channels and promotes better streamlined flow and material combination than a traditional flat disk die module. The die module promotes a reduced overall diameter and wetted diameter in comparison to standard flat disk dies. Further, the present invention relates to a method for utilizing an extrusion die module with a conical or otherwise angled spillover surface to minimize the die surface area wetted by an intermediate layer in a multi-layer coextrusion process.

20 Claims, 8 Drawing Sheets

HYBRID DISK-CONE EXTRUSION DIE MODULE

FIELD OF THE INVENTION

The present invention relates to an extrusion die module. Specifically, the present invention relates to an extrusion die module having a flat compression seal and a conical or otherwise angled spillover surface. Further, the present invention relates to a method for utilizing an extrusion die module with a conical or otherwise angled spillover surface to minimize the die surface area wetted by an intermediate layer in an extrusion process involving at least three layers.

BACKGROUND OF THE INVENTION

An extrusion die for extruding melt material for the creation of flexible films has typically included at least one module having one or a plurality of flow channels to distribute melt over a spillover surface. The melt material may generally flow from the flow channels onto the spillover surface to be extruded therefrom to form a flexible film. In a typical flexible film "bubble" extruder, the module allows molten material to flow over a spillover surface to a gap between a die module and a central mandrel, whereupon a tube of plastic material may be extruded through an annular portion of the extrusion die. The concept also applies to extrusion blow molding parisons, wire coating, pipe extrusion, tube extrusion, etc. Moreover, a plurality of modules may be stacked in series to extrude a plurality of layers into a tubular structure. Each successive module may add a layer to the film structure when the molten material solidifies.

Extrusion die modules are typically nested cylinders, flat disk, or conical die modules. A flat disk module may allow a molten material to flow through flow channels directly onto a flat spillover surface located adjacent to the central mandrel. Each type of module typically consists of a pair of matching portions, or matching halves, that may be disposed one atop of another to form internal flow channels and spillover surfaces within the module. The matching halves may be bolted together to form a single extrusion die module, whereby the molten material may enter via the flow channels and may be extruded annularly after flowing over the spillover surface.

In melt extrusion, it is often desirable to streamline the flow of material from the flow surface of the module to the flow surface of the annular portion of the extrusion die. For example, the material flow may be streamlined by changing the flow direction angle of the material through the module and over the spillover surface by as small an angle as possible at any given point in the material flow. Flat disk extrusion dies are typically unable to generate a large degree of streamlined material flow because the plastic material generally flows through the flow channels of the module and over the spillover surface until it meets the annular portion of the extrusion die. At the annular portion of the extrusion die, the plastic material flow direction changes approximately 90 degrees to flow along the central mandrel that is located perpendicular to the spillover surface of the die module. Conical extrusion die modules are typically better adapted for promoting streamline material flow. The conical portion allows the flow direction angle to change less than 90 degrees as the material flows over the spillover surface and into the gap between the die module and the mandrel.

Moreover, conical extrusion die modules are capable of having a smaller wetted diameter and a smaller overall diameter than similar flat disk extrusion die modules. For example, the flow path of a conical extrusion die module with a flow path entirely at 45 degrees to the module axis needs only to be 71% (sine(45°)) of the radial length of a flat disk extrusion die module with the same area of spillover surface. Reducing both the wetted diameter and the overall die diameter has a number of benefits. For example, less wetted diameter means less hydraulic force is exerted by the melt material. Also, less overall module diameter means less module weight to support, move, and otherwise handle. Similarly, less overall module diameter means less thermal mass to heat and cool, thereby allowing for faster startups and changeovers and better thermal control. Each of the above effects may vary proportionally to the diameter of the die module squared ($d^2$) thus enabling a small reduction in diameter to have a significant positive effect.

Leakage of molten material from the modules may cause many problems. For example, the plastic may leak out of the module to the ambient environment, thereby wasting material and creating potential housekeeping and safety issues. Additionally, the plastic material may degrade into carbon, gels, gas, and/or material of altered physical, chemical, and/or optical properties. Backflow of the degraded material may contaminate the extruded product. Further, plastic materials, such as PVdC and PVC, may form corrosive byproducts, if allowed to leak and degrade, and may lead to corrosion of the extrusion die. A damaged extrusion die is even more susceptible to leakage, leading to more degradation, thereby leading to further corrosion. Moreover, plastic flow outside of the flow channel may act as a hydraulic fluid under pressure to exert forces against adjacent extrusion die modules or other equipment. Consequently, the adjacent die modules may separate, causing further leakage and larger separating forces to be generated. Commonly, seal means are used to prevent plastic flow from leaking or otherwise leaving the flow channel areas of the modules.

A number of seal means for extrusion die modules are presently used. For example, flat surface to flat surface compression seals may be utilized for flat disk dies. Moreover, matched taper seals may be utilized for conical dies. Flat surface to flat surface compression seals are generally more effective than matched taper seals because the matched channels that are cut into matching conical die module halves may move out of alignment as the seals undergo surface wear. Surface wear is particularly damaging for conical dies having the flow channels disposed on the spillover surface(s). Because the flow channels are disposed on the angled portion of the spillover surface(s) of the conical die, surface wear causes the flow channels of the matching module portions to fall out of alignment. As the conical die channels move out of alignment, the degradation areas may increase and the problems discussed above may intensify. Conversely, as flat surface compression seal surfaces undergo surface wear, the matched channels that may be cut into the adjacent dies generally maintain their alignment, because the matching module portions are horizontal and the dislocation effect is minimized.

In multi-layer plastic extrusion, it is often desirable to combine certain material layers as early in the coextrusion system as possible. For example, it is desirable to encapsulate degradation-prone layers with more stable layers as soon as possible. Therefore, the more stable layers protect the degradation-prone layers from the heat of the extrusion system and decrease the time that the degradation-prone material is exposed to the heated surfaces of the extrusion system. In a standard flat disk die, the amount of time that a degradation-prone material may be exposed to heat of the annular portion of the die is related to the thickness of the extrusion die module itself.

When flat disk die modules and conical die modules are stacked in series, the distances that the degradation-prone material is exposed to the surfaces of the extrusion die module is related to the type of die module and order of placement of the die modules in the series. Material layers basically enter the annular portion of the extrusion die from the extrusion die modules separated by a distance approximately equal to the thickness of one die module, in the case of a first flat disk die module positioned downstream of a second flat disk die module. Similarly, material layers typically enter the annular portion of the extrusion die from the extrusion die modules separated by a distance approximately equal to the thickness of one die module in the case of a first conical die module positioned downstream of a second conical die module. Further, material layers typically enter the annular portion of the extrusion die from the extrusion die modules separated by a distance approximately equal to one half the thickness of a flat disk die module in the case of a flat disk die module positioned downstream of a conical disk die module. Moreover, material layers typically enter the annular portion of the extrusion die from the extrusion die modules separated by a distance approximately equal to the thickness of a conical die module plus one half the thickness of a flat disk die module in the case of a conical disk die module positioned downstream of a flat disk die module. Therefore, stacking known flat disk and conical dies in series may cause a degradation-prone material to be exposed to the hot and potentially damaging surface of the die modules and/or the mandrel for at least one half of a die module. In many instances, it is beneficial to encapsulate a degradation prone material layer with a shorter distance between the entry of the multiple layers into the annular portion of the extrusion die.

Accordingly, it is desirable to provide an extrusion die module with the flat surface compression sealing benefits of a flat disk extrusion die and the streamlined flow and reduced diameter benefits of a conical extrusion die. Additionally, it would be beneficial to provide a method of combining multiple material layers within a shorter distance along the annular portion of the extrusion die to allow degradation-prone materials to be encapsulated by more stable layers and to minimize the distance that a degradation-prone layer is exposed to direct contact with the walls of the extrusion die.

SUMMARY OF THE INVENTION

The present invention provides an extrusion die module. Specifically, the present invention relates to an extrusion die module having a flat compression seal and a conical or otherwise angled spillover surface. Further, the present invention relates to a system and a method for utilizing an extrusion die module with a conical or otherwise angled spillover surface to encapsulate an intermediate layer in an extrusion process involving at least three layers.

It is one of the principal objectives of the present invention to provide an extrusion die module with a horizontal flat surface to horizontal flat surface compression seal outside of the distribution channels of the extrusion die module. It is another objective of the present invention to provide an extrusion die with a conical, arched, or vertically cylindrical spillover surface.

It is yet another objective of the present invention to provide an extrusion die module capable of being used to streamline the flow of material being extruded through the die module and through the annular portion of the extrusion die. It is still another objective of the present invention to provide an extrusion die module with a reduced overall diameter.

It is moreover an objective of the present invention to provide an extrusion die module with a reduced wetted diameter. It is a further objective of the present invention to provide an extrusion die module capable of being used to combine layers of material flowing through separate dies modules with a minimum distance between the two entry points of the two layers into the annular portion of the extrusion die.

These and other objectives of the present invention will become apparent upon examining the drawings and figures together with the accompanying written description thereof.

DETAILED DESCRIPTION OF THE DRAWINGS

The present invention relates to a die module that may be used to form extruded plastic products, such as, for example, flexible films from melt material. More specifically, the present invention may allow a melt material to be extruded through flow channels onto a conical or otherwise angled spillover surface. The flow channels may flow from a flat disk portion of the extrusion die module to the spillover surface to present a flat, horizontal sealing surface for the mating portions of the extrusion die. Moreover, the present invention relates to a plurality of extrusion die modules disposed in series to allow encapsulation of degradation-prone polymeric materials within the extrusion die.

Figure 1:
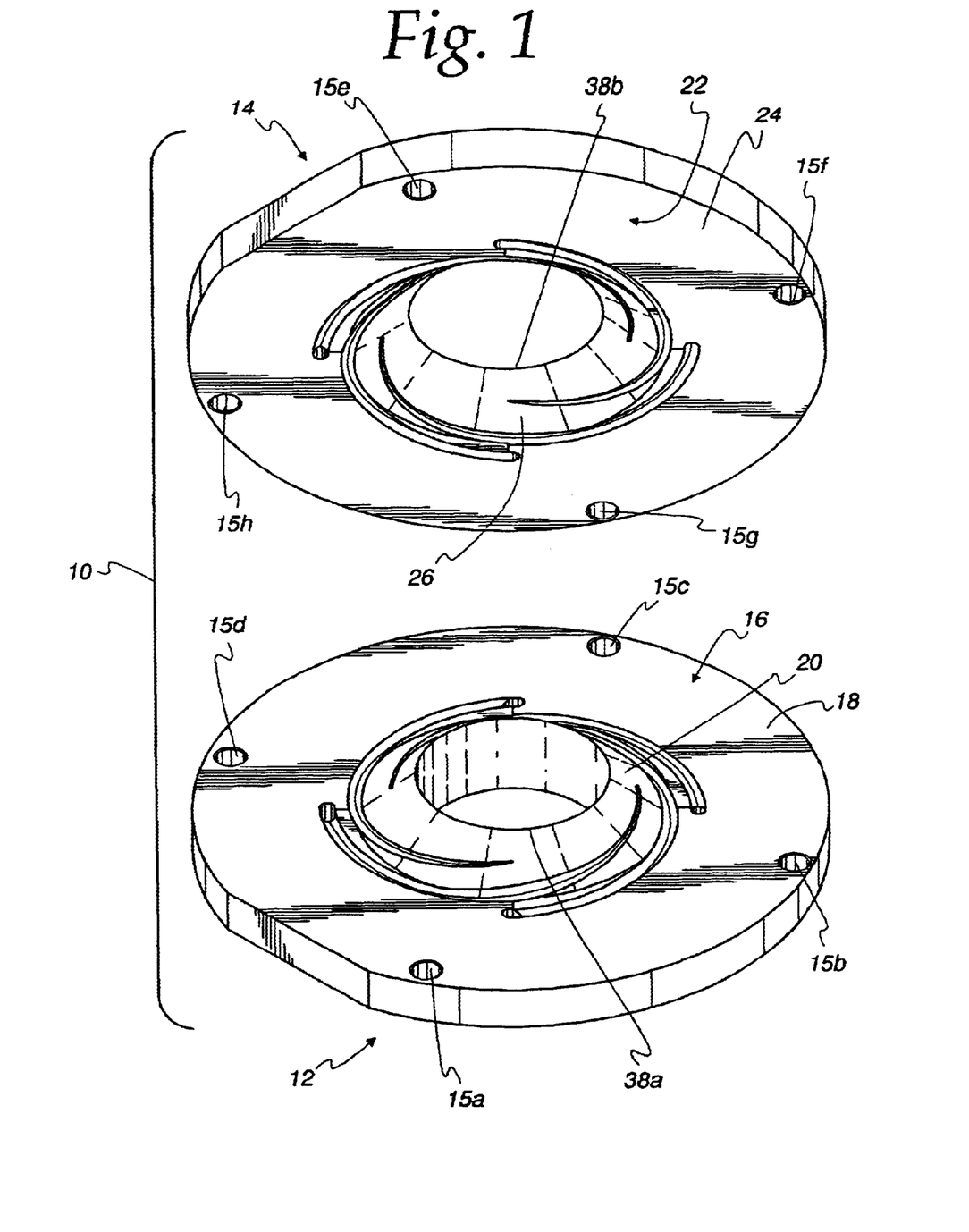
FIG. 1 is an exploded perspective view of an extrusion die module of the present invention.
Figure 5:
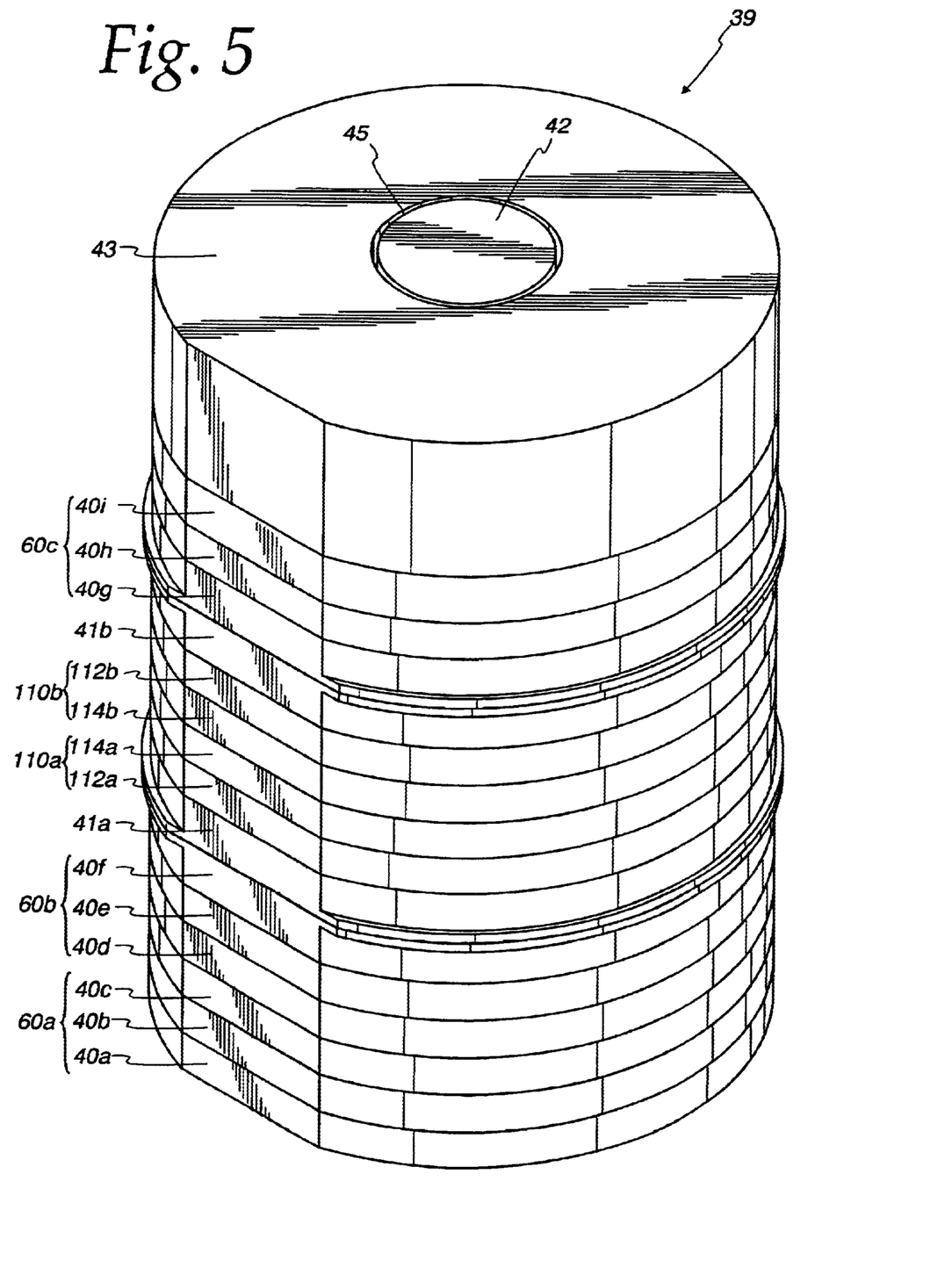
FIG. 5 is a perspective view of stacked extrusion die modules, including two extrusion die modules of the present invention.
Figure 6:
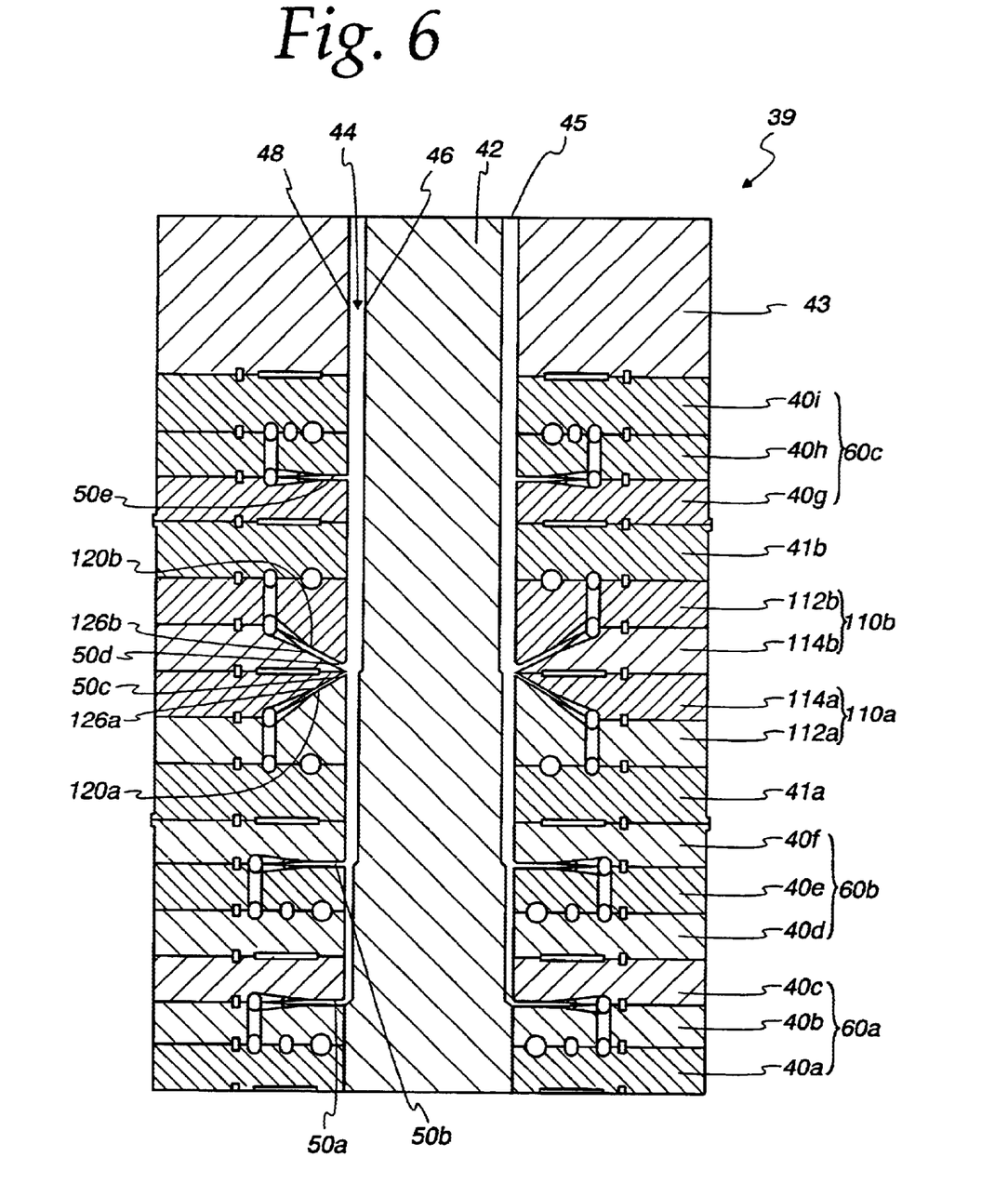
FIG. 6 is a cross-sectional view of an embodiment of stacked extrusion die modules, including two extrusion die modules of the present invention.

Now referring to the Figures, wherein like numerical references refer to like parts, FIG. 1 illustrates an embodiment of an extrusion die module 10 of the present invention. As shown in FIG. 1, the extrusion die module 10 may include an upstream mating portion 12 and a downstream mating portion 14, collectively referred to herein as the mating portions 12,14. The mating portions 12,14 may be coupled together to form the extrusion die module 10 and may be coupled together in any manner apparent to one skilled in the art. For example, bolt holes 15a–15h may be provided for bolting the mating portions 12,14 to each other and to other extrusion die modules. The extrusion die module 10 may be used in a cylindrical stacked extrusion die 39 (as shown in FIGS. 5 and 6) for extruding plastic film or any other similar material. Of course, the bolt holes may be disposed within the mating portions 12,14 in any manner apparent to one having ordinary skill in the art and should not be limited as herein described. Moreover, additional matching bolt holes may be disposed within the mating portions 12,14 to effectively seal mating portion 12 to mating portion 14.

The upstream mating portion 12 may include an inflow surface (not shown) and an outflow surface 16. The outflow surface 16 may include an upstream seal surface 18 and an upstream spillover surface 20. The downstream mating portion 14 may include a downstream flow surface 22 having a downstream seal surface 24 and a downstream spillover surface 26. Alternatively, the inflow surface may be located on the downstream mating portion 14. The upstream seal surface 18 and the downstream seal surface 24 are collectively referred to herein as the seal surfaces 18,24. The upstream spillover surface 20 and the downstream spillover surface 26 are collectively referred to herein as the spillover surfaces 20,26. Each of the spillover surfaces 20,26 may be conical, arced, or in the extreme, cylindrical. Additionally, each of the spillover surfaces 20,26 may be configured to include any combination of one or more angles and radii.

For example, the upstream spillover surface 20 may transition from the upstream seal surface 18 at an angle between zero and ninety degrees, inclusively, or at an arc. In a preferred embodiment, the upstream spillover surface 20 may transition from the upstream seal surface 18 at an angle of forty-five degrees.

In one embodiment, the spillover surfaces 20,26 may be designed to create a slit from a flow channel created between the spillover surfaces 20,26 that is approximately 70/1000 of an inch wide at an exit location 38a,38b of the mating portions 12, 14. Alternatively, the spillover surfaces 20,26 may be designed to create any sized and shaped flow channel that would be apparent to one skilled in the art. For example, it may be beneficial to create a flow channel whose thickness varies along the radial length of the flow channel. Further, it may be beneficial to include a flow channel including one or more radii to achieve desired flow characteristics. Non-linear flow channel geometry may provide more uniform distribution of the melt material as polymers generally exhibit non-linear flow characteristics.

When the mating portions 12,14 are coupled together, the seal surfaces 18,24 may form a flat surface to flat surface compression seal surrounding the spillover surfaces 20,26 as is further described below. Additionally, when the mating portions 12,14 are coupled together, a flow channel (as shown in FIG. 6) may be formed between the spillover surfaces 20,26 as further described below.

Figure 2:
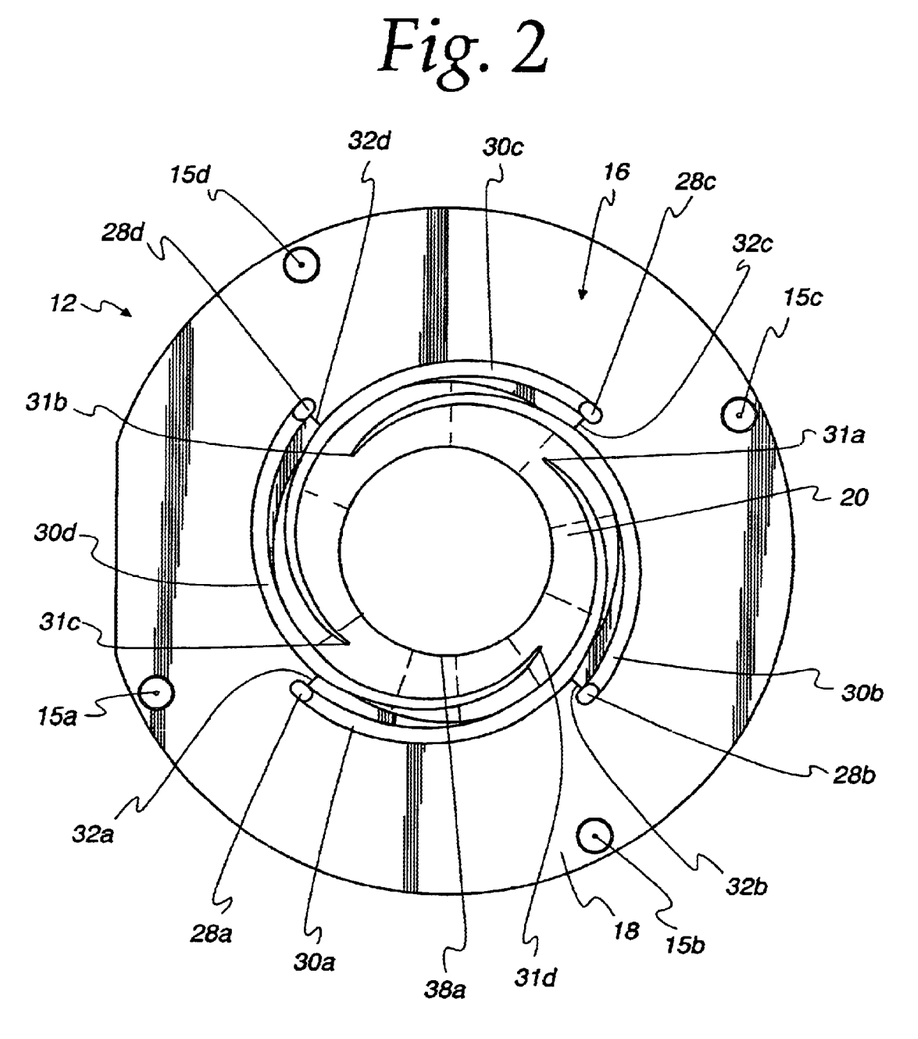
FIG. 2 is a top view of an upstream portion of an extrusion die module of the present invention.

Referring now to FIG. 2, one or more distribution passages 28a–28d may be located in the upstream mating portion 12 for providing a flow path for plastic material to flow from the inflow surface (not shown) to the outflow surface 16 of the upstream mating portion 12. The distribution passages 28a–28d may be apertures that may allow melt material to pass from the inflow surface to the outflow surface 16. For example, the distribution passages 28a–28d may be generally oval shaped apertures as shown in FIG. 2. However, any other shaped apertures may be utilized without detracting from the present invention. In the embodiment of the present invention shown in FIG. 2, the distribution passages 28a–28d may be located in the face of the flat upstream seal surface 18. Consequently, in the embodiment shown in FIG. 2, the outer perimeters of the distribution passages 28a–28d may partially define the inner perimeter of the seal surface 18 as further described below. Alternatively, the distribution passages 28a–28d may be configured in any manner apparent to one skilled in the art. For example, both the inflow surface and the distribution passages may be located in the downstream mating portion 14.

Melt material may flow along the inflow surface (not shown) of the upstream mating portion 12, through the distribution passages 28a–28d, and to the outflow surface 16 as would be apparent to one skilled in the art. For example, there may be a inflow channel (not shown) located along the inflow surface of the upstream portion 12 for transferring the melt material flow from an extruder to the distribution passages 28a–28d. The inflow channel may be designed to provide a flow path configuration wherein the flow of plastic material travels an equal linear distance along the inflow channel to arrive at each of the distribution passages 28a–28d approximately simultaneously. The inflow channel may be formed from a pair of matched half-channels cut into adjacent surfaces of adjacent die mating portions, including the upstream mating portion 12. Alternatively, the inflow channel may be formed within the downstream mating portion 14.

In various embodiments of the present invention, the inflow channel may be located on the outflow surface 16 of the upstream mating portion 12, on the downstream flow surface 22, or may be formed from matching half-channels cut into the mating portion 12, 14 to eliminate the need for the distribution passages 28a–28d. However, in a preferred embodiment, the inflow channel is located on the inflow surface of the upstream mating portion 12, or on the inflow surface of the downstream mating portion 14, to help reduce the overall diameter of the extrusion die module 10. Of course, the melt material may be transferred to the distribution passages 28a–28d from the extruder in any manner apparent to one having ordinary skill in the art.

One or more upstream distribution channels 30a–30d may be located on the outflow surface 16 of the upstream mating portion 12. Melt material may flow from the distribution passages 28a–28d to the upstream distribution channels 30a–30d. The number of upstream distribution channels 30a–30d may correspond to the number of distribution passages 28a–28d. Further, the upstream distribution channels 30a–30d may be configured as matching half-channels for mating with the downstream distribution channels 34a–34d when the upstream mating portion 12 is mated with the downstream mating portion 14. In the embodiment illustrated in FIG. 2, there may be four spiral upstream distribution channels 30a–30d located symmetrically around the axis of the upstream mating portion 12. Spiral upstream distribution channels 30a–30d may be employed to avoid developing a radial weld line in the extruded plastic film as may be developed by a cross-head die. Additionally, utilizing a plurality of symmetrical spiral channels may improve the flow characteristics of plastic material as it flows over the outflow surface 16 of the upstream mating portion 12. Alternatively, there may be any number of upstream distribution channels 30a–30d arranged in any configuration as would be apparent to one skilled in the art.

In the embodiment shown in FIG. 2, the portions of the upstream distribution channels 30a–30d adjacent to the distribution passages 28a–28d are located in the upstream seal surface 18. As the upstream distribution channels 30a–30d spiral inwardly towards the inner diameter of the upstream mating portion 12, the upstream distribution channels 30a–30d transition out of the flat plane of the upstream seal surface 18 and onto the plane of the upstream spillover surface 20. Consequently, the outer perimeters of the upstream distribution channels 30a–30d may partially define the inner perimeter of the upstream seal surface 18 as further described below.

The upstream distribution channels 30a–30d may vary in depth and length as may be apparent to one having ordinary skill in the art. For example, the upstream distribution channels 30a–30d may be a particular depth when the melt material flows from the upstream distribution passages 28a–28d but may decrease in depth as the melt material flows along the upstream distribution channels 30a–30d until the depth of the upstream distribution channels 30a–30d is zero, relative to the surface that the distribution channels are disposed in, at points 31a–31d. Moreover, the length and distance between the upstream distribution channels 30a–30d may vary. This may allow the upstream distribution channels 30a–30d to evenly distribute the melt material on the spillover surface 20, depending on the properties of the melt material, such as, for example, the viscosity of the material.

The geometry of the upstream distribution channels 30a–30d in the upstream spillover surface 20 is typically designed through the use of proprietary design software. The software typically analyzes the material to be extruded as well as the temperature, pressure, and rate of extrusion to determine the proper geometry for the upstream distribution channels 30a–30d the upstream spillover surface 20. For example, with all other factors held constant, a material with a higher viscosity may require wider or deeper upstream distribution channels 30a–30d than a material with a lower viscosity.

There may be one or more upstream seal surface boundaries 32a–32d located along the outflow surface 16 of the upstream mating portion 12 as shown in FIG. 2. The number of upstream seal surface boundaries 32a–32d may correspond to the number of upstream distribution passages 28a–28d and the number of upstream distribution channels 30a–30d. The upstream seal surface boundaries 32a–32d may separate the upstream seal surface 18 from the upstream spillover surface 20. Consequently, as shown in FIG. 2, the inner perimeter of the upstream seal surface 18 may be defined by the outer perimeters of the distribution passages 28a–28d, the outer perimeter of the upstream distribution channels 30a–30d, and the upstream seal surface boundaries 32a–32d.

For example, as illustrated in FIG. 2, the outer perimeter of the seal surface 18 may be located along the outer perimeter of the outflow surface 16. The inner perimeter of the seal surface 18 may trace a path that follows the length of the upstream seal surface boundaries 32a–32d to the outer perimeters of the distribution passages 28a–28d, along the outer perimeters of the distribution passages 28a–28d (in a counter-clockwise direction) towards the outer perimeters of the upstream distribution channels 30a–30d, and along the outer perimeters of the upstream distribution channels 30a–30d to the adjacent upstream seal surface boundaries 32a–32d. Thus, the distribution passages 28a–28d and the upstream distribution channels 30a–30d may be located entirely within the inner perimeter of the upstream seal surface 18. Consequently, the upstream seal surface 18 may be the portion of the outflow surface 16 of the upstream mating portion 12 located between the outer perimeter of the outflow surface 16 and the outer perimeters of the distribution passages 28a–28d, the outer perimeters of the upstream distribution channels 30a–30d, and the upstream seal surface boundaries 32a–32d.

The outer perimeter of the upstream seal surface 18 may be defined by the outer perimeter of the outflow surface 16 of the upstream mating portion 12. Alternatively, the outer perimeter of the upstream seal surface 18 may be defined in any manner apparent to one skilled in the art. For example, the outer perimeter of the upstream seal surface 18 may end where the plurality of bolt holes 15a–h may be disposed.

Figure 3:
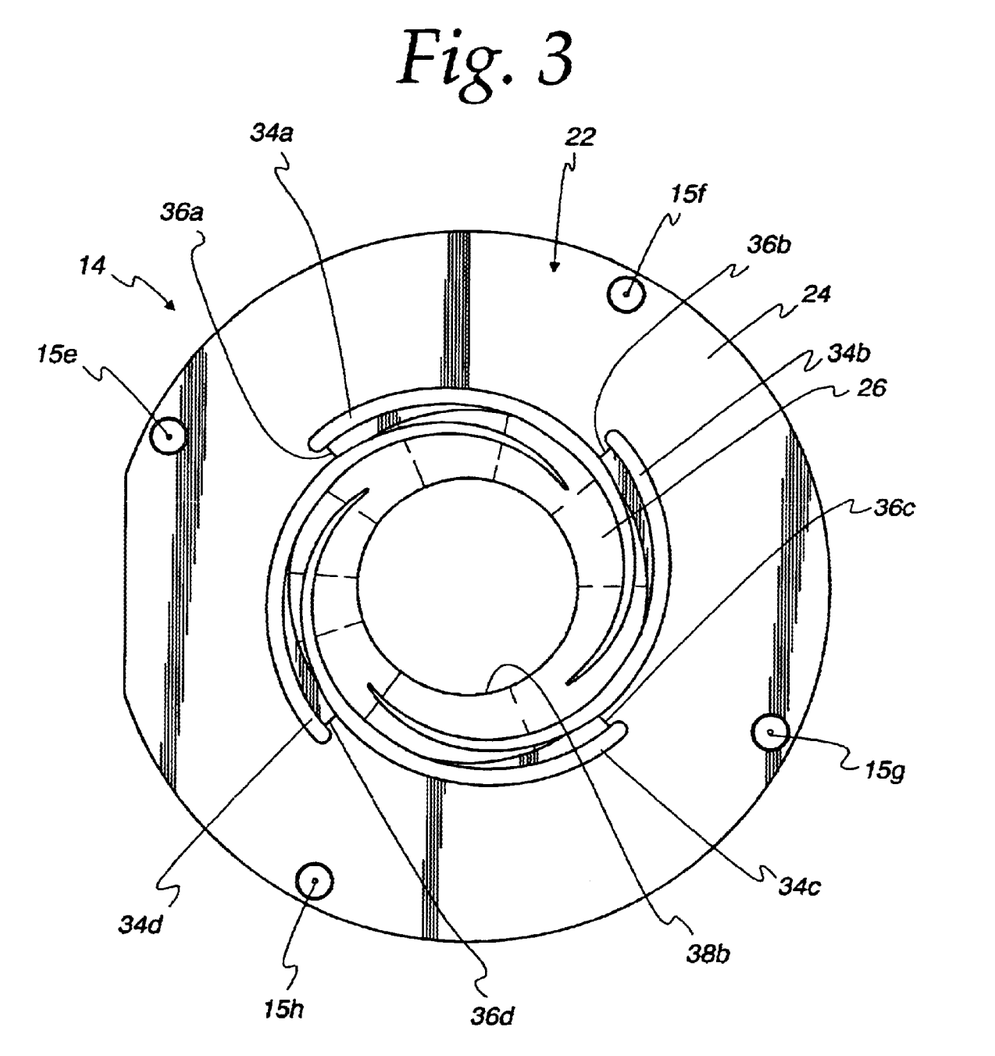
FIG. 3 is a top view of a downstream portion of an extrusion die module of the present invention.

Turning now to FIG. 3, a downstream mating portion 22 may be configured as shown. One or more downstream distribution channels 34a–34d may be located on the downstream flow surface 22 of the downstream mating portion 14. The downstream flow surface 22 may be horizontal and planar. The number of downstream distribution channels 34a–34d may correspond to the number of upstream distribution channels 30a–30d. In the preferred embodiment illustrated in FIG. 3, there may be four spiral downstream distribution channels 34a–34d located symmetrically around the axis of the downstream mating portion 14. Moreover, the downstream distribution channels 34a–34d may be configured as matching half-channels for mating with the upstream distribution channels 30a–30d when the upstream mating portion 12 is mated with the downstream mating portion 14. Alternatively, there may be any number of downstream distribution channels 34a–34d arranged in any configuration as would be apparent to one skilled in the art. As described above with reference to the upstream distribution channels 30a–3d, the geometry of the downstream distribution channels 34a–34d is typically designed through the use of proprietary design software.

In the embodiment shown in FIG. 3, the portions of the downstream distribution channels 34a–34d located furthest from the axis of the downstream mating portion 14 may be located in the horizontal, planar downstream seal surface 24. Similar to the upstream distribution channels 30a–30d described above, as the downstream distribution channels 34a–34d spiral inwardly towards the inner diameter of the downstream mating portion 14, the downstream distribution channels 34a–34d may transition out of the flat plane of the downstream seal surface 24 and onto the plane of the downstream spillover surface 26. Consequently, the outer perimeters of the downstream distribution channels 34a–34d may partially define the inner perimeter of the downstream seal surface 24 as further described below.

There may be one or more downstream seal surface boundaries 36a–36d located along the downstream flow surface 22 of the downstream mating portion 14, as shown in FIG. 3. The number of downstream seal surface boundaries 36a–36d may correspond to the number of upstream seal surface boundaries 32a–32d. The downstream seal surface boundaries 36a–36d may separate the downstream seal surface 24 from the downstream spillover surface 26. Consequently, as shown in FIG. 3, the inner perimeter of the downstream seal surface 22 may be defined by the outer perimeters of the downstream distribution channels 34a–34d and the downstream seal surface boundaries 36a–36d.

For example, as illustrated in FIG. 3, the outer perimeter of the downstream seal surface may be defined by the outer perimeter of the downstream flow surface 22 of the downstream mating portion 14. The inner perimeter of the downstream seal surface 24 may trace a path that follows the length of the downstream seal surface boundaries 36a–36d and along the outer perimeters of the downstream distribution channels 34a–34d to the adjacent downstream seal surface boundaries 36a–36d. Thus, the downstream distribution channels 34a–34d may be located entirely within the inner perimeter of the downstream seal surface 24. Consequently, the downstream seal surface 24 may be the portion of the downstream flow surface 22 of the downstream mating portion 14 located between the outer perimeter of the downstream flow surface 22 and the outer perimeters of the downstream distribution channels 34a–34d and the downstream seal surface boundaries 36a–36d.

The outer perimeter of the downstream seal surface 24 may be defined by the outer perimeter of the downstream flow surface 22 of the downstream mating portion 14. Alternatively, the outer perimeter of the downstream seal surface may be defined in any manner apparent to one skilled in the art.

As molten plastic flows out of the distribution passages 28a–28d, the molten plastic may flow along the flow channels that may be formed by the mating portions of the distributions channels 30a–30d, as shown in FIG. 2, and the distribution channels 34a–34d, as shown in FIG. 3. As the melt material flows along these flow channels, the melt material spills over onto the upstream spillover surface 20 (of the upstream mating portion 14) and the downstream spillover surface 26 (of the downstream mating portion 22) through the flow channel formed therebetween. As the melt material spills over onto the spillover surfaces 20,26, the melt material may be evenly distributed over the spillover surfaces 20,26 to form a continuous tube of melt material that may exit the extrusion module 10 at the exit locations 38a,38b of the mating portions 12,14, respectively.

Figure 4:
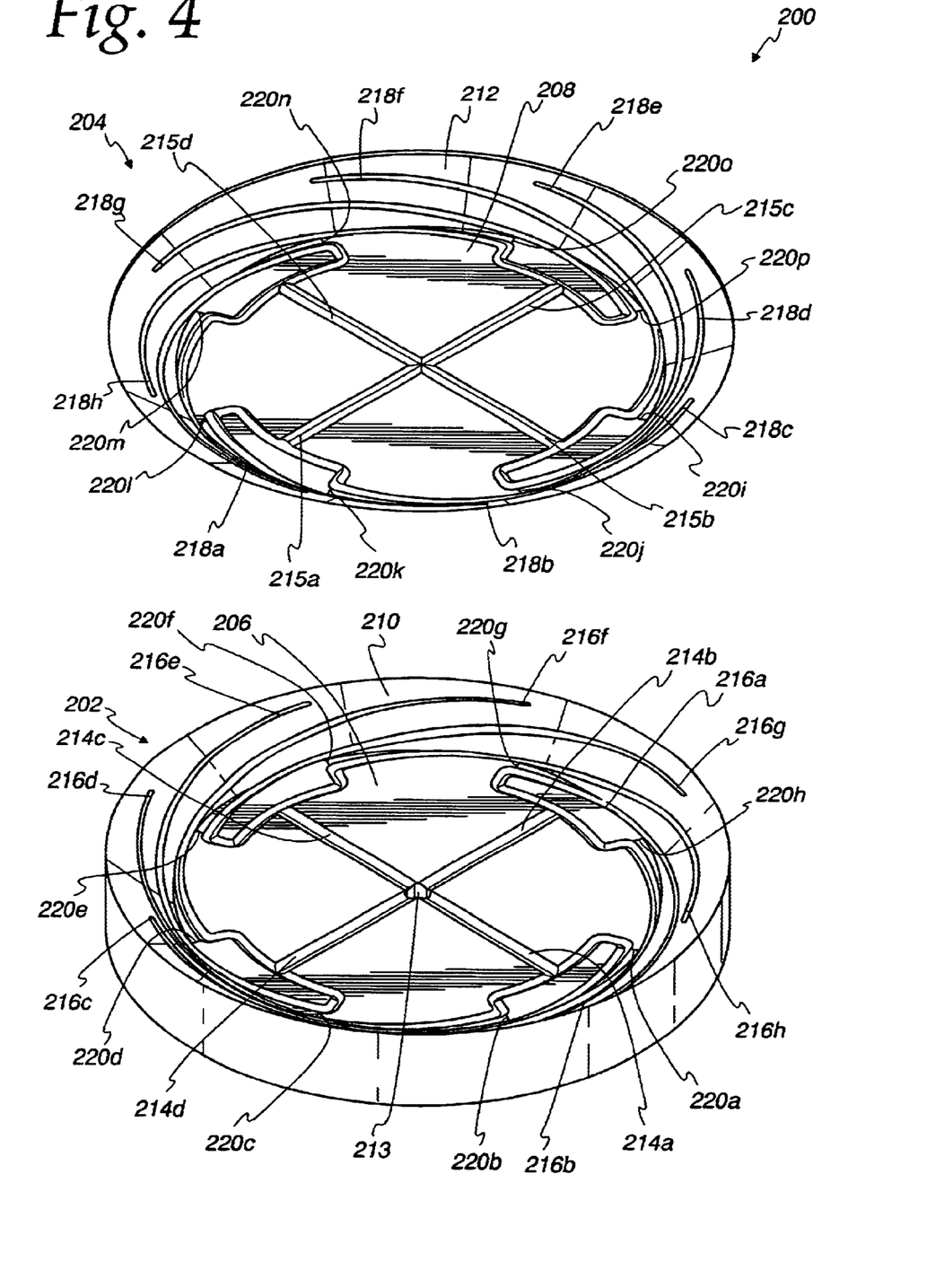
FIG. 4 is an exploded perspective view of another extrusion die module of the present invention.

FIG. 4 illustrates another embodiment of an extrusion die module 200 of the present invention. As shown in FIG. 4, the extrusion die module 200 may include an upstream mating portion 202 and a downstream mating portion 204, collectively referred to herein as the mating portions 202,204. Additionally, the upstream mating portion 202 may include an upstream seal surface 206 and the downstream mating portion 204 may include a downstream seal surface 208, collectively referred to herein as the seal surfaces 206,208. Further, the upstream mating portion 202 may include an upstream spillover surface 210 and the downstream mating portion 204 may include a downstream spillover surface 212, collectively referred to herein as the spillover surfaces 210,212. Moreover, the upstream mating portion 202 may include an inflow passage 213, one or more upstream inflow channels 214a–214d, and one or more upstream distribution channels 216a–216h. Similarly, the downstream mating portion 204 may include one or more downstream inflow channels 215a–215d as well as one or more downstream distribution channels 218a–218h. The upstream inflow channels 214a–214d and the downstream inflow channels 215a–215d are collectively referred to herein as the inflow channels 214a–214d,215a–215d. The upstream distribution channels 216a–216h and the downstream distribution channels 218a–218h are collectively referred to herein as the distribution channels 216a–216h,218a–218h.

As shown in FIG. 4, the spillover surfaces 210,212 and the distribution channels 216a–216h,218a–218h may be located entirely outside the outer perimeter of the seal surfaces 206,208. The outer perimeter of the upstream seal surface 206 may be partially defined by seal surface boundaries 220a–220h. Moreover, the outer perimet of the downstream seal surface 208 may be partially defined by seal surface boundaries 220i–220p. The spillover surfaces 210,212, the inflow channels 214a–214d,215a–215d and the distribution channels 216a–216h,218a–218h may be configured to provide flat-surface to flat-surface compression seal surfaces 206,208 surrounded by conical spillover surfaces 210,212. The embodiment of the extrusion die module 200 illustrated in FIG. 4 may also include one or more bolt holes (not shown) as described above with respect to FIG. 2.

The inflow passage 213 may be centrally located in the upstream mating portion 202 as shown in FIG. 4. Alternatively, the inflow passage 213 may be offset from the central axis of the upstream mating portion 202 in any position apparent to one having ordinary skill in the art. Melt material may flow from an extruder (not shown) through the inflow passage 213 to the upstream mating portion 202. The extruder may be connected to the inflow passage 213 by an extrusion tube (not shown) passing through extrusion die modules disposed beneath the upstream mating portion 202. Alternatively, an inflow passage may be disposed within the downstream mating portion 204 and an extrusion tube may be connected to the inflow passage in the downstream mating portion 204 and may pass through the extrusion die modules disposed above the upstream mating portion 204. In a multi-layer extrusion die 139 (FIG. 7) including one or more of the extrusion die modules 200 of the present invention, it may be beneficial to utilize offset inflow passages to allow a plurality of extruders to be connected to a plurality of upstream mating portions 202.

FIG. 5 illustrates an embodiment of a cylindrical stacked extrusion die 39 of the present invention. The cylindrical stacked extrusion die 39 may include one or a plurality of the extrusion die module 10 as described above with reference to FIGS. 1–3. Reference numerals 110a, 110b in FIG. 5 refer to extrusion die modules as described, with reference to FIGS. 1–3, as the extrusion die module 10. In addition to the extrusion die modules 110a,110b of the present invention, the cylindrical stacked extrusion die 39 may include one or a plurality of flat disk die modules 40a–40i. As an alternative to, or in addition to the flat disk die module portions 40a–40i, the cylindrical stacked extrusion die 39 may include one or a plurality of the conical extrusion die module 10 (not shown) or any other extrusion die modules apparent to one skilled in the art.

The cylindrical stacked extrusion die 39 may also include additional module portions 41a,41b adjacent to the upstream mating portions 112a,112b, respectively, for forming inflow channels as described above. Reference numerals 112a, 114a and 112b, 114b refer to mating portions, as described with reference to FIGS. 1–3, as mating portions 12,14. An end cap 43 may be utilized as the uppermost module in the cylindrical stacked extrusion die 39. A central mandrel 42 may be located along the vertical axis of the cylindrical stacked extrusion die 39. An exit orifice 45 may be formed at the top of a central flow channel 44 (shown in FIG. 6).

FIG. 6 illustrates a cross-sectional view of an embodiment of the cylindrical stacked extrusion die 39 shown in FIG. 5. The cylindrical stacked extrusion die 39 shown in FIG. 6 may include two extrusion die modules 110a,110b having additional module portions 41a, 41b respectively, and three flat disk extrusion die modules 60a–60c, comprising extrusion die module portions 40a–40c, 40d–40f, and 40g–40i, respectively. Alternatively, the cylindrical stacked extrusion die 39 may include any number of extrusion die modules 110a,110b, and 60a–60c as may be apparent to one skilled in the art. The central mandrel 42 may be located along the vertical axis of the cylindrical stacked extrusion die 39 as described above. The cylindrical stacked extrusion die 39 may include a central flow channel 44 having an inner diameter 46 which is defined by the outer diameter of the central mandrel 42 and an outer diameter 48 which is defined by the surface formed by the inner diameter of the extrusion die modules 110a,110b, and 60a–60c and the inner surface of the end cap 43. Alternatively, the central flow channel 44 may be formed in any manner apparent to one skilled in the art.

The stacked extrusion die modules 110a,110b, and 60a–60c may form one or a plurality of outflow channels 50a–50e for passing melt material from one or a plurality of plastic extruders (not shown) to the central flow channel 44. For example, the spillover surfaces 120a,120b, and 126a, 126b of the extrusion die modules 110a,110b corresponding to spillover surfaces 20, 26 of the extrusion die module 10 shown in FIGS. 1–3, may form one or a plurality of the outflow channels 50c,50d. Alternatively, there may be any number of outflow channels 50a–50e that may be formed in any manner apparent to one skilled in the art.

Melt material may flow from the outflow channels 50a–50e to the central flow channel 44 to form a multi-layered plastic extrudate. A multi-layered plastic film, having a number of layers equal to the number of outflow channels 50a–50e, may be extruded from the cylindrical stacked extrusion die 39. For example, a five layered plastic film may be extruded in the cylindrical stacked extrusion die 39. Alternatively, a multi-layered film having any number of layers apparent to one skilled in the art may be extruded in the cylindrical stacked extrusion die 39 depending on the number of extrusion die modules are present in the extrusion die.

A first layer of melt material may flow from the outflow channel 50a into the central flow channel 44. The first layer of melt material may flow along the both the inner diameter 46 and the outer diameter 48 of the central flow channel 44 until the molten material reaches the outflow channel 50b. A second layer of melt material may flow from the second outflow channel 50b into the central flow channel 44. As the second layer of melt material enters the central flow channel 44, the first layer of melt material may continue to flow along the inner diameter 46 of the central flow channel 44, and the second layer of melt material may flow along the outer diameter 48 of the central flow channel 44 until the outflow channel 50c.

A third layer of melt material may flow from the third outflow channel 50c into the central flow channel 44. As the third layer of melt material enters the central flow channel 44, the first layer of melt material may continue to flow along the inner diameter 46 of the central flow channel 44, the third layer of melt material may flow along the outer diameter 48 of the central flow channel 44 until the outflow channel 50d. When the third melt material enters the central flow channel 44, the second layer of melt material may be encapsulated between the first and third layers of melt material. However, at this point, the second layer of melt material will have traveled along the hot outer diameter of the central flow channel 44 between the outflow channel 50b and the outflow channel 50c. The third outflow channel 50c may be formed by the extrusion die module 110a. Further, the third outflow channel 50c may streamline the flow of the third layer of melt material into the central flow channel 44.

A fourth layer of melt material may flow from the fourth outflow channel 50d into the central flow channel 44. As the fourth layer of melt material from the fourth outflow channel 50d enters the central flow channel 44, the third layer of melt material may be instantly encapsulated between the second and fourth layers of melt material without contacting the hot outer diameter 48. The fourth outflow channel 50d may also be formed by the extrusion die module of the present invention 110b. Further, the fourth outflow channel 50d may be configured such that the fourth layer of melt material flows into the central flow channel 44 against the flow of the first three layers of melt material. In such a configuration, the third layer of melt material is encapsulated between the second and fourth layers of melt material with minimal exposure to the outer diameter 48 of the central flow channel 44 because the fourth layer of melt material enters the central flow channel 44 a minimal distance downstream of the point at which the third layer of melt material enters the central flow channel 44.

A fifth layer of melt material may flow from the outflow channel 50e into the central flow channel 44. As the fifth layer of melt material enters the central flow channel 44, the fifth layer of melt material may flow along the outer diameter 48 of the central flow channel 44, encapsulating the fourth layer of melt material between the third and fifth molten plastic layers.

Further, any number of additional outflow channels 50a–50e may be utilized in the cylindrical stacked extrusion die 39 such that each successive outflow channel 50a–50e may introduce a layer of melt material to the central flow channel 44.

The extrusion die modules 110a, 110b of the present invention may be utilized in the cylindrical stacked extrusion die 39 to streamline the flow of melt material into the central flow channel 44 as would be apparent to one skilled in the art. Additionally, the extrusion die modules 110a, 110b of the present invention may be utilized in the cylindrical stacked extrusion die 39 to combine multiple melt material layers within a shorter distance along the central flow channel 44 to allow degradation-prone materials to be instantly encapsulated by more stable layers and to minimize the distance that a degradation-prone layer is exposed to direct contact with the walls of the extrusion die modules 110a,110b, and 60a–60c.

For example, in an embodiment of the cylindrical stacked extrusion die 39 of the present invention, a multi-layered plastic film having five layers may be extruded. The five-layered film may include, for example, an outer abuse layer, a first tie layer, a barrier layer, a second tie layer, and an inner sealant layer. For example, the outer abuse layer and the inner sealant layer may be any structural plastic material apparent to one skilled in the art. Additionally, the barrier layer may be methyl acrylate-polyvinylidene chloride copolymer (also known as MA-PVdC or MA-Saran®) or another halogenated polymer. Similarly, the barrier layer may be ethylene vinyl alcohol copolymer (EVOH), a polyketone, a styrene acrylonitrile copolymer such as the polymer manufactured by BP Amoco under the trademark Barex® Resins, a polyhydroxy ether or polyphenoxy ether such as the thermoplastic resin manufactured by The Dow Chemical Company under the trademark BLOX®, or any other material apparent to one skilled in the art that may be sensitive to high temperatures, high dwell time, and metal contact and may be utilized as an internal layer of the film structure. Further, the first tie layer and the second tie layer may be any material used to bind the barrier material to the outer abuse layer and/or the inner sealant layer. Moreover, the first tie layer and the second tie layer may be less degradation-prone than the barrier layer.

In the embodiment illustrated in FIG. 6, the inner sealant layer may enter the central flow channel 44 through the first outflow channel 50a and may flow along the both the inner diameter 46 and the outer diameter of the central flow channel 44 until the second outflow channel 50b. The second tie layer may enter the central flow channel 44 through the second outflow channel 50b and may flow along the outer diameter 48 of the central flow channel 44 until the third outflow channel 50c, and the inner sealant layer may flow along only the inner diameter 46 of the central flow channel 44.

The degradation-prone barrier layer may enter the central flow channel 44 through the third outflow channel 50c. The inner sealant layer may continue to flow along the inner diameter 46 of the central flow channel 44 and the second tie layer may be encapsulated between the inner sealant layer and the barrier layer.

The first tie layer may enter the central flow channel 44 through a fourth outflow channel 50d, instantly encapsulating the barrier layer between the first and second tie layers. The extrusion die module 110b of the present invention having the fourth outflow channel 50d may be configured such that the spillover surfaces 120b,126b direct the flow of the first tie layer against the flow of the material in the central flow channel 44. Consequently, the first tie layer may enter the central flow channel 44 a minimal distance along the central flow channel 44 from the entry of the barrier layer to allow the degradation-prone barrier layer to be encapsulated by the more stable first and second tie layers. This configuration may minimize the distance that the degradation-prone layer is exposed to direct contact with the hot outer diameter 48 of the central flow channel 44.

The outer abuse layer may enter the central flow channel 44 through the fifth outflow channel 50e and may flow along the outer diameter 48 of the central flow channel 44, instantly encapsulating the first and second tie layers and the barrier layer between the outer abuse layer and the inner sealant layer. The five layer structure as herein described may then be extruded through the exit orifice 45 whereupon the molten material may solidify into solid flexible films, tubes, molded articles, etc. upon the application of cooling means.

Figure 7:
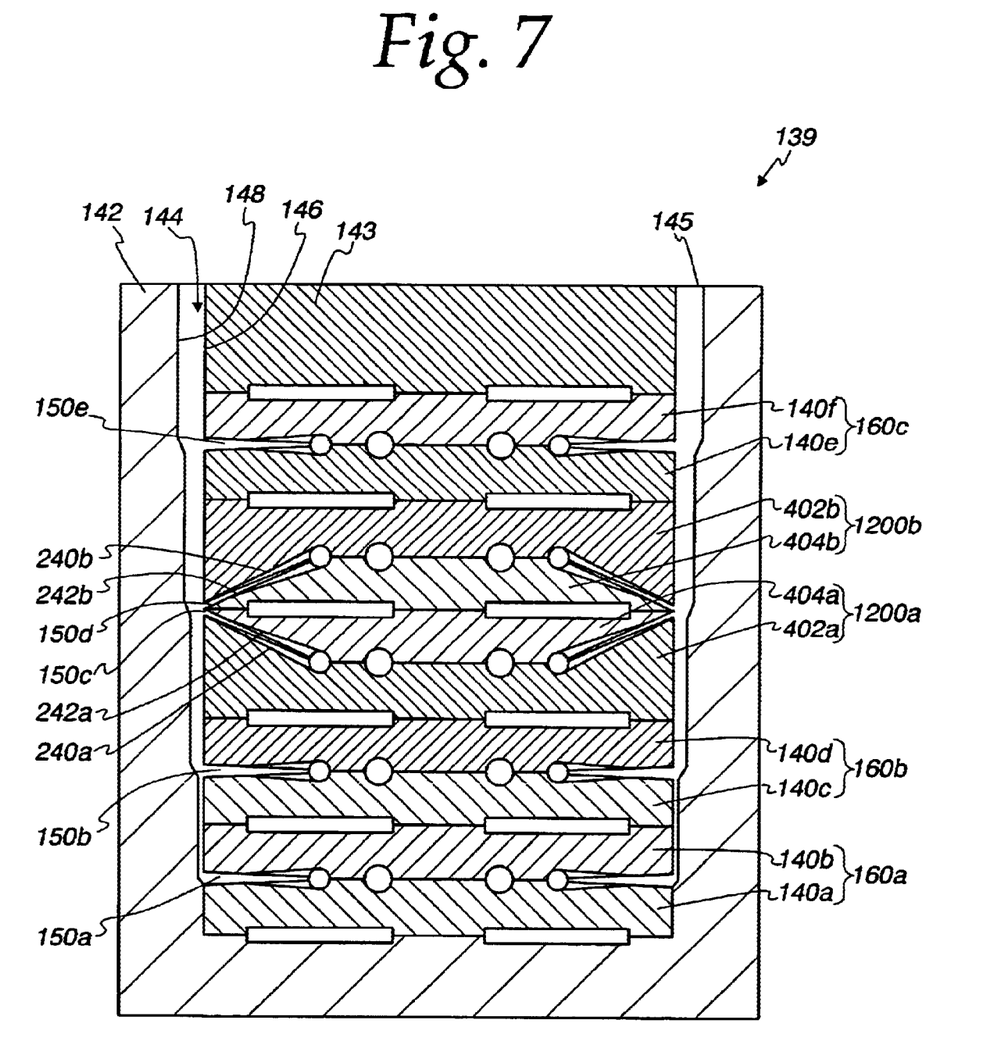
FIG. 7 is a cross-sectional view of another embodiment of stacked extrusion die modules, including two extrusion die modules of the present invention.

FIG. 7 illustrates a cross-sectional view of another embodiment of a cylindrical stacked extrusion die 139 of the present invention. The cylindrical stacked extrusion die 139 shown in FIG. 7 may include two extrusion die modules 1200a,1200b of the present invention. Reference numerals 1200a,1200b, comprising extrusion die mating portions 402a,404a and 402b,404b respectively, refer to extrusion die modules as described, with reference to FIG. 4, as extrusion die module 200 having mating portions 202,204. In addition to the extrusion die modules 1200a,1200b of the present invention, the cylindrical stacked extrusion die 139 may include one or a plurality of flat disk die modules 160a–160c that may comprise flat disk extrusion die module mating portions 140a, 140b; 140c,140d; and 140e, 140f, respectively. Alternatively, the cylindrical stacked extrusion die 139 may include any number of extrusion die modules 1200a,1200b, and 160a–160c apparent to one skilled in the art. An outer housing 142 may surround the cylindrical stacked extrusion die 139 creating a flow channel 144 having an inner diameter 146 which is defined by the surface formed by the outer diameter of extrusion die modules 1200a,1200b, and 140a–140f and the outer surface of an end cap 143. The flow channel 144 may also have an outer diameter 148 that is defined by the inner diameter of the outer housing 142. Alternatively, the flow channel 144 may be formed in any manner apparent to one skilled in the art.

The stacked extrusion die modules 1200a,1200b, and 160a–160c may form one or a plurality of outflow channels 150a–150e for passing melt material from one or a plurality of plastic extruders (not shown) to the flow channel 144. For example, spillover surfaces 240a,240b, and 242a,242b of the extrusion die modules 1200a,1200b, corresponding to the spillover surfaces 210 and 212, respectively, of the extrusion die module mating portions 202,204, as described above with reference to FIG. 4, may form one or a plurality of the outflow channels 150c,150d. Alternatively, there may be any number of outflow channels 150a–150e that may be formed in any manner apparent to one skilled in the art.

Melt material may flow from the outflow channels 150a–150e to the flow channel 144 to extrude a multi-layered plastic extrudate. A multi-layered plastic film, having a number of layers equal to the number of outflow channels 150a–510e, may be extruded in the cylindrical stacked extrusion die 139. For example, a five layered plastic film may be extruded in the cylindrical stacked extrusion die 139. Alternatively, a multi-layered film having any number of layers apparent to one skilled in the art may be extruded in the cylindrical stacked extrusion die 139.

A first layer of melt material may flow from a first outflow channel 150a into the flow channel 144. The first layer of melt material may flow along the both the inner diameter 146 and the outer diameter 148 of the flow channel 144 until the molten material reaches a second outflow channel 150b. A second layer of melt material may also flow from the second outflow channel 150b into the flow channel 144. As the second layer of melt material enters the flow channel 144, the first layer of melt material may continue to flow along the outer diameter 148 of the flow channel 144, and the second layer of melt material may flow along the inner diameter 146 of the flow channel 144 until a third outflow channel 150c.

A third layer of melt material may also flow from the third outflow channel 150c into the flow channel 144. As the third layer of melt material enters the flow channel 144, the first layer of melt material may continue to flow along the outer diameter 148 of the flow channel 144, the third layer of melt material may flow along the inner diameter 146 of the flow channel 144 until a fourth outflow channel 150d, and the second layer of melt material may be encapsulated between the first and third layers of melt material. The third outflow channel 150c may be formed by the extrusion die module of the present invention 1200a. Further, the third outflow channel 150c may streamline the flow of the third layer of melt material into the flow channel 144.

A fourth layer of melt material may flow from the fourth outflow channel 150d into the flow channel 144. As the fourth layer of melt material from the fourth outflow channel 150d enters the flow channel 144, the third layer of melt material may be instantly encapsulated between the second and fourth layers of melt material. The fourth outflow channel 150d may be formed by the extrusion die module of the present invention 1200a. Further, the fourth outflow channel 150d may be configured such that the fourth layer of melt material flows into the flow channel 144 against the flow of the first three layers of melt material. In such a configuration, the third layer of melt material is encapsulated between the second and fourth layers of melt material with minimal exposure to the inner diameter 146 of the flow channel 144 because the fourth layer of melt material enters the flow channel 144 a minimal distance downstream of the point at which the third layer of melt material enters the flow channel 144.

A fifth layer of melt material may flow from the fifth outflow channel 150e into the flow channel 144. As the fifth layer of melt material enters the flow channel 144, the fifth layer of melt material may flow along the inner diameter 146 of the flow channel 144, encapsulating the fourth layer of melt material between the third and fifth molten plastic layers.

Further, any number of additional outflow channels may be utilized in the cylindrical stacked extrusion die 139 such that each successive outflow channel may introduce a layer of melt material to the flow channel 144.

The extrusion die modules 1200a,1200b of the present invention may be utilized in the cylindrical stacked extrusion die 139 to streamline the flow of melt material into the flow channel 144 as would be apparent to one skilled in the art. Additionally, the extrusion die modules 1200a, 1200b of the present invention may be utilized in the cylindrical stacked extrusion die 139 to combine multiple melt material layers within a shorter distance along the flow channel 144 to allow degradation-prone materials to be encapsulated by more stable layers and to minimize the distance that a degradation-prone layer is exposed to direct contact with the walls of the extrusion die modules 1200a,1200b, and 140a–140f.

Figure 8:
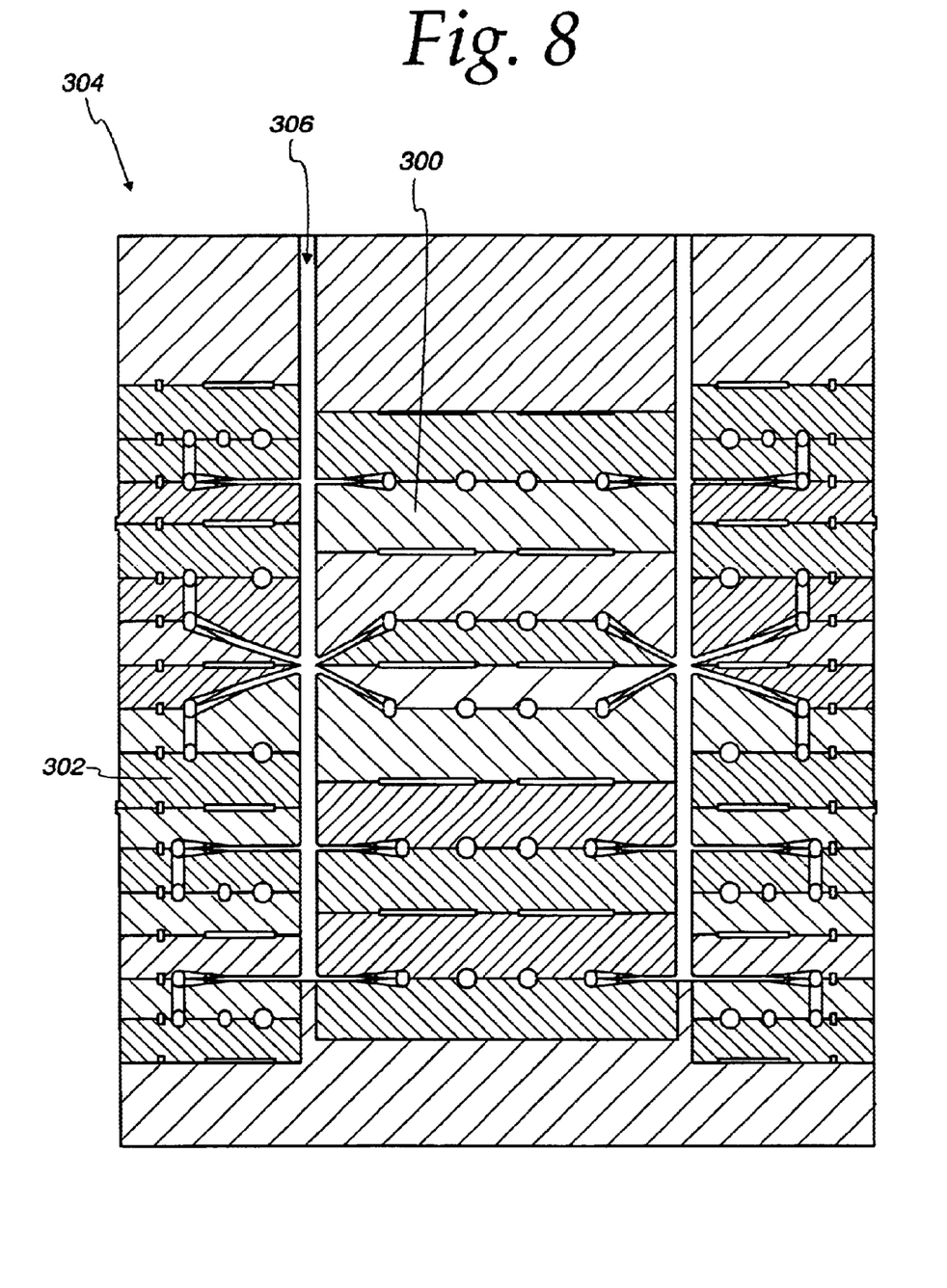
FIG. 8 is a cross-sectional view of another embodiment of the present invention, including a stacked extrusion die assembly having a pair of extrusion dies wherein one extrusion die is disposed within the other extrusion die.

FIG. 8 illustrates another embodiment of the extrusion die of the present invention. In FIG. 8, a first set of stacked extrusion die modules 300 and a second set of stacked extrusion die modules 302 may be combined to form an extrusion die assembly 304. The first set of stacked extrusion die modules 300 may comprise a series of extrusion die modules as shown and described with reference to FIG. 7. The second set of stacked extrusion die modules 302 may comprise a series of extrusion die modules as shown and described with reference to FIG. 6. The first set of extrusion die modules 300 may be located along the central axis of the second set of extrusion die modules 302, in place of the central mandrel shown in FIG. 6. Consequently, a flow channel 306 may be located between the outer diameter of the first set of extrusion die modules 300 and the inner diameter of the second set of extrusion die modules 302. Therefore, a greater number of outflow channels per given extrusion die height may be provided in this embodiment of the extrusion die than in either of the embodiments shown in FIG. 6 or 7. The extrusion die modules in the first set of stacked extrusion die modules 300 and the second set of stacked extrusion die modules 302 are not intended to be limited to the extrusion die modules disclosed herein. The extrusion die assembly 304 may include any extrusion die modules that may be configured such that the first set of extrusion die modules may be located within the second set of extrusion die modules.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. An extrusion die module comprising:
   a first mating portion comprising:
      a first planar seal surface defining a first plane;
      a first spillover surface disposed adjacent to said first planar seal surface and, at least in part, outside of said first plane;
      at least one first distribution channel extending from said first seal surface to said first spillover surface; and
      at least one first seal surface boundary having a first end point and a second end point, wherein said at least one first seal surface boundary intersects said at least one first distribution channel at said first and second end points along said first plane.

2. The extrusion die module of claim 1 wherein said first spillover surface is conical.

3. The extrusion die module of claim 1 wherein said at least one first distribution channel further comprises a plurality of distribution channels.

4. The extrusion die module of claim 3 wherein said plurality of distribution channels are symmetrically configured spiral distribution channels.

5. The extrusion die module of claim 3 wherein said at least one first seal surface boundary further comprises a plurality of first seal surface boundaries corresponding to the number of said plurality of distribution channels.

6. The extrusion die module of claim 5 wherein each of said plurality of distribution channels is connected to another of said plurality of distribution channels by one of said plurality of first seal surface boundaries.

7. The extrusion die module of claim 1 further comprising:
   a second mating portion comprising:
      a second planar seal surface defining a second plane;
      a second spillover surface disposed adjacent to said second planar seal surface and, at least in part, outside of said second plane;
      at least one second distribution channel extending from said second seal surface to said second spillover surface; and
   at least one second seal surface boundary having a first end point and a second end point, wherein said at least one second seal surface boundary intersects said at least one second distribution channel at said first and second end points along said second plane.

8. A modular extrusion die assembly comprising:
   a plurality of extrusion die modules disposed in series having an upstream end and a downstream end, wherein a first extrusion die module comprises:
      a first mating portion comprising:
         a first planar seal surface defining a first plane;
         a first spillover surface disposed adjacent to said first planar seal surface and, at least in part, outside of said first plane;
         at least one first distribution channel extending from said first seal surface to said first spillover surface; and
         at least one first seat surface boundary having a first end point and a second end point, wherein said at least one first seal surface boundary intersects said at least one first distribution channel at said first and second end points along said first plane.

9. The modular extrusion die assembly of claim 8 wherein said first mating portion further comprises:
   a second mating portion comprising:
      a second planar seal surface defining a second plane;
      a second spillover surface disposed adjacent to said second planar seal surface and, at least in part, outside of said second plane;
      at least one second distribution channel extending front said second seal surface to said second spillover surface; and
      at least one second seal surface boundary having a first end point and a second end point, wherein said at least one second seal surface boundary intersects said at least one second distribution channel at said first and second end points along said second plane.

10. The modular extrusion die assembly of claim 8 wherein a second extrusion die module comprises:
   a third mating portion comprising:
      a third planar seal surface defining a third plane;
      a third spillover surface disposed adjacent to said third planar seal surface and, at least in part, outside of said third plane;
      at least one third distribution channel extending from said third seal surface to said third spillover surface; and
      at least one third seal surface boundary having a first end point and a second end point, wherein said at least one third seal surface boundary intersects said at least one third distribution channel at said first and second end points along said third plane.

11. The modular extrusion die of claim 10 wherein said second extrusion die module further comprises:
   a fourth mating portion comprising;
      a fourth planar seal surface defining a fourth plane;
      a fourth spillover surface disposed adjacent to said fourth planar seal surface and, at least in part, outside of said fourth plane;
      at least one fourth distribution channel extending from said fourth seal surface to said fourth spillover surface; and
      at least one fourth seal surface boundary having a first end point and a second end point, wherein said at least one fourth seal surface boundary intersects said at least one fourth distribution channel at said first and second end points along said fourth plane.

12. The modular extrusion die of claim 10 wherein said first spillover surface and said second spillover surface extend away from said first seal surface and said second seal surface, respectively, towards said downstream end of the extrusion die assembly and said third spillover surface and said fourth spillover surface extend away from said third seal surface and said fourth seal surface, respectively, towards said upstream end of the extrusion die assembly.

13. A method of extruding molten plastic resin through an extrusion die assembly comprising the steps of:
   providing an extrusion die module comprising:
      a first mating portion comprising:
         a first planar seal surface defining a first plane;
         a first spillover surface disposed adjacent to said first planar seal surface and, at least in part, outside of said first plane;
         at least one first distribution channel extending from said first seal surface to said first spillover surface; and
         at least one first seal surface boundary having a first end point and a second end point, wherein said at least one first seal surface boundary intersects said at least one first distribution channel at said first and second end points along said first plane; and
   extruding melt material through said extrusion die module to form an extrudate.

14. The method of claim 13 wherein said first spillover surface is conical.

15. The method of claim 13 wherein said at least one first distribution channel further comprises a plurality of distribution channels.

16. The method of claim 15 wherein said at least one first seal surface boundary further comprises a plurality of first seal surface boundaries corresponding to the number of said plurality of distribution channels.

17. The meted of claim 16 wherein each of said plurality of distribution channels is connected to another of said plurality of distribution channels by one of said plurality of first seal surface boundaries.

18. The method of claim 13 wherein said extrusion die module further comprises:
   a second mating portion comprising:
      a second planar seal surface defining a second plane;
      a second spillover surface disposed adjacent to said second planar seal surface and, at least in part, outside of said second plane;
      at least one second distribution channel extending from said second seal surface to said second spillover surface; and
      at least one second seal surface boundary having a first end point and a second end point, wherein said at least one second seal surface boundary intersects said at least one second distribution channel at said first and second end points along said second plane.

19. A method of forming a film having at least three layers comprising the steps of:
   providing a modular extrusion die assembly having at least three extrusion die modules, wherein a second extrusion die module is disposed between a first extrusion die module and a third extrusion die module, wherein said second extrusion die module and said third extrusion die module each comprise:
      a first mating portion comprising:
         a first planar seal surface defining a first plane;
         a first spillover surface disposed adjacent to said first planar seal surface and, at least in pan, outside of said first plane;
         at least one first distribution channel extending from said first seal surface to said first spillover surface; and
         at least one first seal surface boundary having a first end point and a second end point, wherein said at least one first seal surface boundary intersects said at least one first distribution channel at said first and second end points along said first plane; and
   extruding a first melt material through said first extrusion die module, a second melt material through said second extrusion die module, and a third melt material through said third extrusion die module to form an extrudate having at least three layers of material.

20. The method of claim 19 wherein said first spillover surface of said second extrusion die module extends away from said first seal surface of said second extrusion die module towards said downstream end of said extrusion die assembly and said first spillover surface of said third extrusion die module extends way from said first seal surface of said third extrusion die module towards said upstream end said extrusion die assembly such that said second melt material is encapsulated between said first melt material and said third melt material as said second melt material exits said second extrusion die module.

* * * * *